United States Patent [19]

Abraham

[11] Patent Number: 4,567,512
[45] Date of Patent: Jan. 28, 1986

[54] RECORDED PROGRAM COMMUNICATION SYSTEM

[75] Inventor: Nicholas F. Abraham, Cape Coral, Fla.

[73] Assignee: World Video Library, Inc., Tex.

[21] Appl. No.: 536,660

[22] Filed: Sep. 28, 1983

Related U.S. Application Data

[63] Continuation-in-part of Ser. No. 409,566, Aug. 19, 1982, Pat. No. 4,521,806, which is a continuation-in-part of Ser. No. 383,604, Jun. 1, 1982.

[51] Int. Cl.³ .............................................. H04N 7/18
[52] U.S. Cl. .................... 358/86; 358/194.1; 455/4; 455/151; 455/181
[58] Field of Search ................... 358/85, 86, 114, 122, 358/141, 142, 194.1; 455/5, 4, 151, 181

[56] References Cited

U.S. PATENT DOCUMENTS

| 4,361,351 | 11/1982 | Asip et al. ........................ 455/5 |
| 4,381,522 | 4/1983 | Lambert ........................... 455/5 |
| 4,388,643 | 6/1983 | Aminetzah .................... 358/114 |
| 4,422,093 | 12/1983 | Pargee, Jr. ..................... 358/142 |
| 4,450,477 | 5/1984 | Lovett ............................ 358/142 |
| 4,455,570 | 6/1984 | Saeki et al. ....................... 455/5 |

Primary Examiner—Edward L. Coles, Sr.
Attorney, Agent, or Firm—Jacob Shuster

[57] ABSTRACT

Selected program code and time data entered into a subscriber command terminal automatically establishes a two-way telephone link with a library computer from which instruction data is transferred to the command terminal for subsequent programmed reception and reproduction of broadcast signals by a standard receiver coupled to the command terminal. The broadcast signal originates at a library of program records linked by a one-way broadcast transmitter to a plurality of the subscriber command terminals.

10 Claims, 8 Drawing Figures

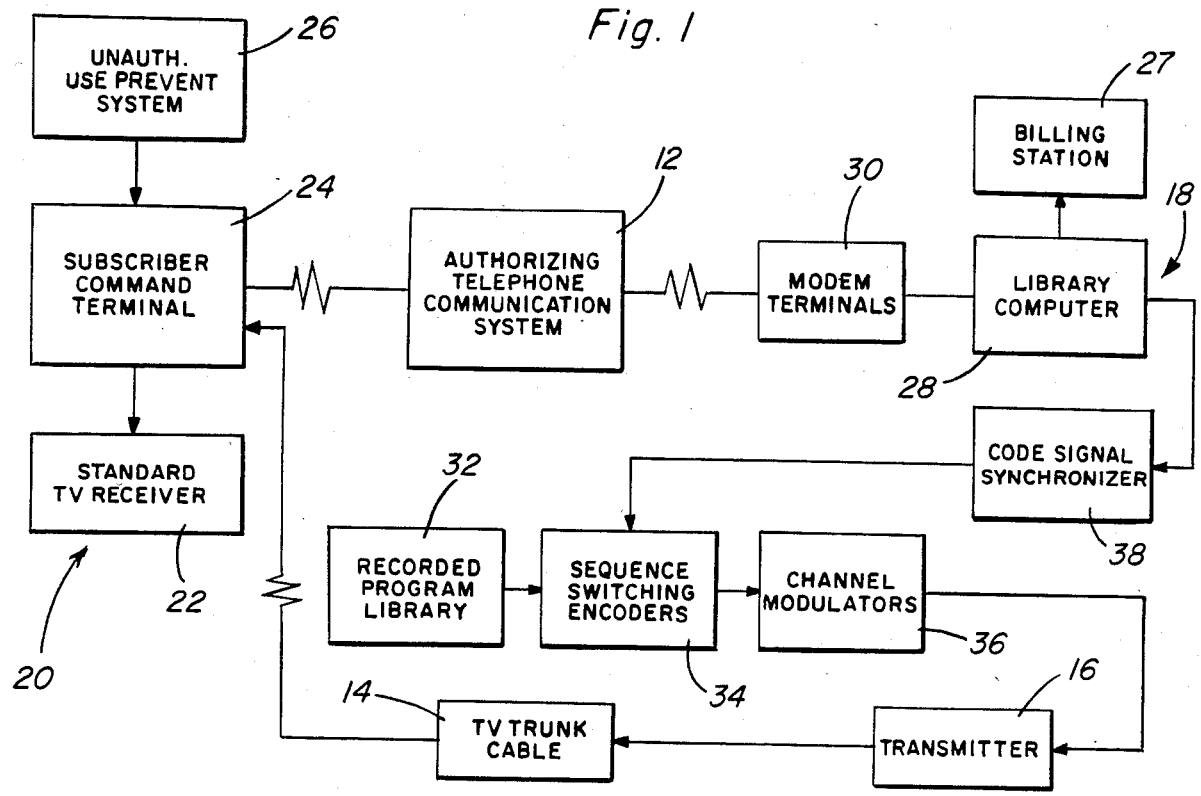

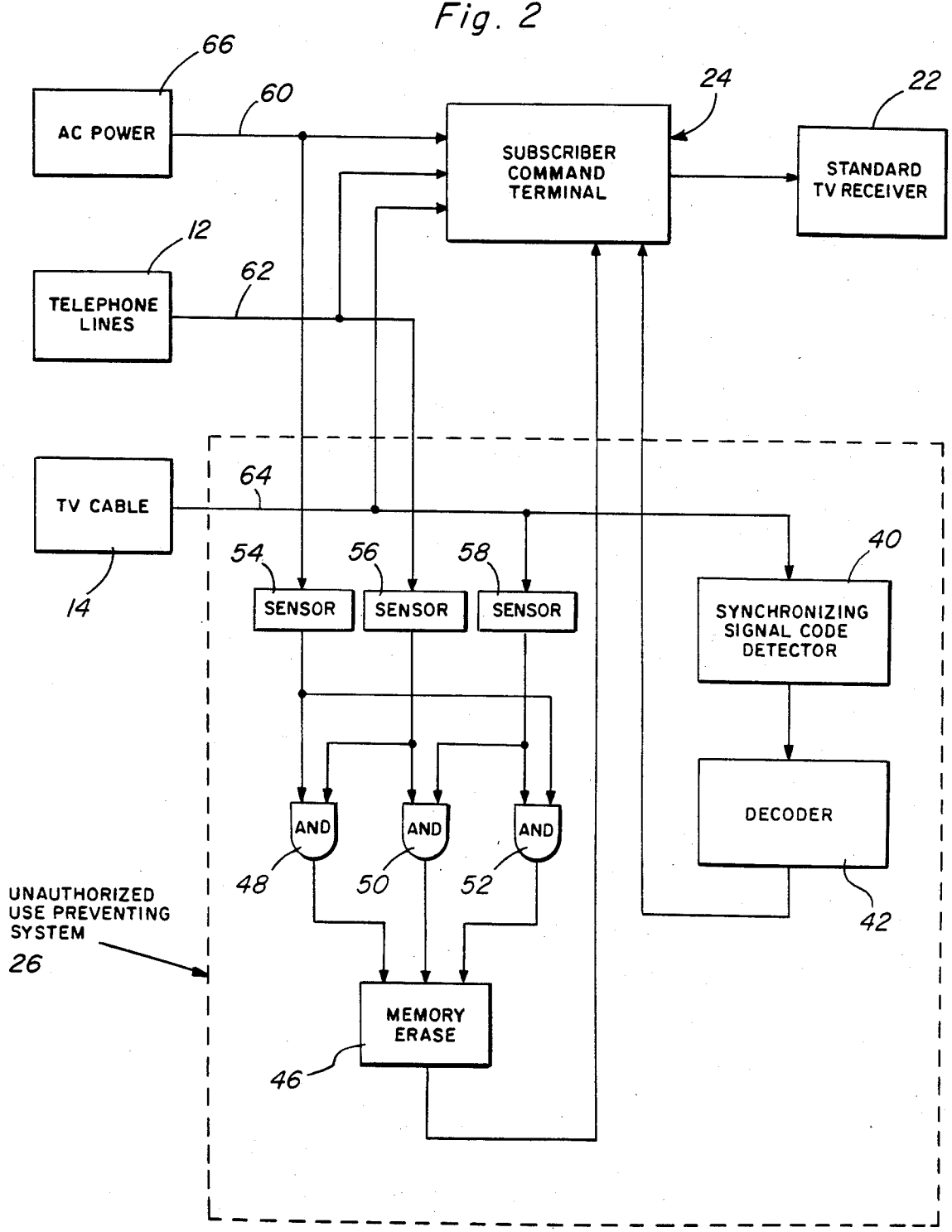

RECORDED PROGRAM COMMUNICATION SYSTEM

CROSS-REFERENCE TO RELATED APPLICATIONS

This application is a continuation-in-part of a subscription television broadcasting system utilizing two-way telephone communication and one-way broadcast communication, disclosed in my prior copending application Ser. No. 409,566, filed Aug. 19, 1982, now U.S. Pat. No. 4,521,806, which is a continuation-in-part of application Ser. No. 383,604, filed June 1, 1982.

BACKGROUND OF THE INVENTION

The broadcast of video/audio intelligence in the form of television program material on a subscription basis has become more widespread and popular. Various subscription broadcast systems are, therefore, being made available to the public, offering different subscriber servicing capabilities and corresponding subscription charges in an effort to generate public interest at a reasonable cost and receive public acceptance through regional licensing authorities.

Competition with existing non-subscription television broadcast networks and among the various subscription cable systems has also heightened efforts in offering a broader range of entertainment and educational program material for selection by subscribers under time schedules most desirable for the greatest number of subscribers. However, the diversity in public tastes, preferences, and time schedule limitations make program selection and scheduling by the broadcasters difficult. The result is broadcast scheduling decisions that are less than satisfactory. In order to meet the conflicting factors involved, the cable systems provide a large number of broadcast channels. Nevertheless, speculation as to public preferences in the selection of program material is dependent upon time scheduling.

Subscription broadcast systmes may provide bi-directional cable communication. Such system transmits information by analog signal modulation of the carrier signal transmitted to the subscribers within channels that require a predetermined amount of frequency separation to avoid image "ghosting". The number of transmission channels is accordingly limited.

It is, therefore, an object of the present invention to transfer program selection and scheduling judgments heretofore made by the broadcaster to the subscribers. It is a further object to effect such transfer of selection and scheduling judgments by use of available telephone communication to avoid bi-directional communication through the trunkline cable and thereby provide additional channels for uni-directional program transmission.

According to prior copending application Ser. No. 383,604, aforementioned, signal traffic paths are established for telephone communication and cable program transmission in a basic subscription broadcast system meeting the foregoing objectives. According to prior co-pending application Ser. No. 409,566, now U.S. Pat. No. 4,521,806 aforementioned, the program material stored at the library broadcast station in analog form, is digitized and time compressed after readout for transmission to the subscribers along the cable paths. Each subscriber station accordingly has signal detection facilities for time expansion of the cable transmitted signal and conversion thereof to analog form for reproduction by the television receiver. Security against unauthorized use is provided by telephone code enabled signal direction at the subscriber stations, which includes two speed control of a record signal player through which time compressed video signals are expanded for real time reproduction. Such digitizing of the cable transmitted signal reduces minimum frequency separation heretofore required between channels. Time compression of the cable signal increases the program delivery capacity of the system. Thus, the number of channels, the number of stored programs, and the number of subscribers capable of being serviced is increased to an unexpected degree.

Other objects of the present invention in accordance with the preceding objects are to provide access to recorded broadcast material in a library in a manner compatible with standard television receiver operation and normal telephone communication, and yet enhance security against unauthorized use and provide facilities for future functional expansion of the system.

SUMMARY OF THE INVENTION

Pursuant to the present invention, each subscriber is provided with a command terminal unit through which program selection is effected by automatic dialing in response to entry of a code. An individual identification code may be added to impose a selection restriction. The program selection portion of the code will be obtained from a published menu of programs distributable to subscribers.

The command terminals at the subscriber stations are provided with an indicator or display operated after a program selection is entered to initiate a timing cycle during which the subscriber may cancel the program selection and the billing operation by depressing a cancel button on the command console.

Establishment of a telephone link from a subscriber station by dialing the library broadcast station through the telephone utility switchgear, provides a signal path to one of a plurality of line-loading modems interfaced with a library computer at the broadcast station. Once the program selection process is completed without cancellation, such event is entered into the library computer to initiate a billing operation and terminate the telephone communication link. Excessive telephone tie-up is thereby avoided.

The library computer may be programmed to not only perform its primary program selecting, billing and instruction functions but also accumulate and correlate the data from which statistical logic judgments on program popularity are made. Based on such logic judgments, library program schedules may be updated.

In accordance with the present invention, program selection code and time data are entered by key pad selectors into the memory of a microprocessor forming part of the command terminal unit plugged into a telephone jack of a telephone communication system and coupled to a television trunk cable, a standard television receiver and a power supply at a subscriber station. The data entered is displayed on the control panel of the command terminal unit for visual verification by the subscriber before a command pushbutton on the control panel is actuated. The microprocessor is programmed to store the entered data and change the tuner setting of the television receiver to special library channels, and upon actuation of the command pushbutton initiate an automatic dialing operation. The microprocessor is interfaced with the display, the television receiver and an automatic dialer by latch, decoder, multiplexer and converter components to perform programmed functions. When the dialing operation is completed, a telephone link is established through interfacing modems between the microprocessor in the subscriber command unit and remote library computer for interchange of information by an interrogative and responsive operation.

The library computer is interfaced with the telephone lines by a plurality of modems through which separate telephone links are established, each link transmitting identification, channel and time information relating to one of the program codes representing a separate and distinct recorded video/audio program in a library of recorded program players such as video tape recorders. The program players are periodically operated during preset time segments pursuant to a program schedule for broadcast by a television cable broadcast transmitter.

The library computer is programmed to perform a search and match operation upon receipt of program code and time information from one of the subscriber command units through a telephone link established as aforementioned. Upon completion of such operation, the library computer transmits program time, channel and scrambling code information to the microprocessor of the innterrogating subscriber command unit for storage of such data in its memory, annd then instructs the interfacing modem to "hang-up" or terminate the telephone link.

The microprocessor in the subscriber command unit is programmed to timely issue commands after hang-up, based on the library computer generated instruction data stored in its random access memory. Such commands are transmitted through the latch, decoder and multiplexer components to a down converter through which the television receiver is coupled to the television trunk cable in order to initiate receiver reception at the selected program start time and terminate such reception at the end of the program. The microprocessor is also programmed to erase instructive data from its random access memory upon termination of such program.

Premature memory erase of memory stored data is effected by appropriate logic when a physical discontinuity is sensed in any two of the connections of a command unit to its power supply, the telephone line and the television trunk cable, as part of an unauthorized use preventing system embodied in the command unit. The system also includes a detector which recognizes an inaudible synchronizing tone in the broadcast signal transmitted by the television cable. Such tone is used together with a previously stored scrambling code to control the down converter. The down converter thereby also functions as a signal descrambler based on a code originating at the library. As an additional security precaution, the aforementioned interrogative and response operation may be repeated before memory reload in the command unit is effected. An initially established telephone link will accordingly transmit an identifying code from the command unit to the library computer for matching with the subscriber dial code followed by hang-up and reestablishment of the telephone link by the library computer for transmission of program instruction data to the subscriber command unit.

The command unit is also provided with a cancel switch to erase the microprocessor memory before the stored instruction data is read out for initiating selected program reception by the television receiver. Further, a channel control switch is provided for library program interruption to enable standard program reception on the receiver.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a block diagram generally illustrating the system with which the present invention is associated.

FIG. 2 is a block circuit diagram illustrating in greater detail a subscriber station forming part of the system depicted in FIG. 1.

FIG. 3 is an elevation view of the control panel of the command terminal at each subscriber station.

DESCRIPTION OF PREFERRED EMBODIMENT

Figure 4:
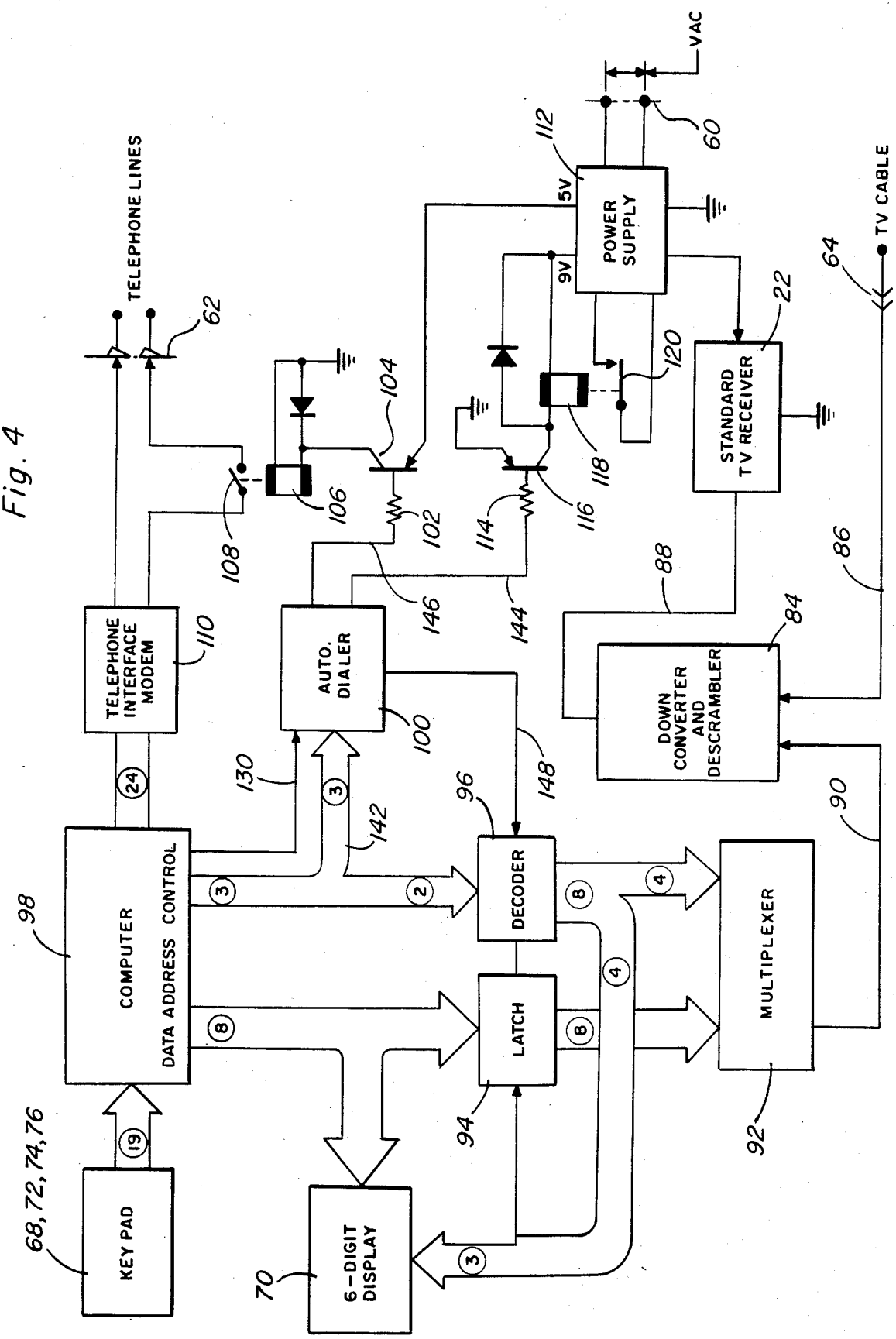
FIG. 4 is a block and circuit diagram of the command terminal.

Referring now to the drawings in detail, FIG. 1 schematically illustrates the basic arrangement of the present invention, generally referred to by reference numeral 10, which utilizes two separate communication systems, consisting of a conventional, two-way, authorizing telephone system 12 and a one-way television broadcast system having, for example, a trunk cable 14 and a transmitter 16. The two communication systems interlink a recorded program library station 18 with a plurality of subscriber stations 20, one of which is shown in FIG. 1. Each subscriber station 20 has a standard television receiver 22 coupled to the broadcast cable 14 through a command terminal unit 24 having an unauthorized use preventing system 26 associated therewith. The command unit 24 is also coupled to the telephone system 12 so as to provide each subscriber with access to information stored at the library station 18 and to provide billing information to a billing station 27.

As denoted in FIG. 1, a library computer 28 at station 18 is coupled to the lines of the telephone system 12 through a plurality of modem terminals 30 to establish separate two-way communication links with the computer 28. Each recording in library 32 is stored in a player such as a video tape recorder that is periodically operated in an output mode during assigned scheduled time segments for transmission of intelligence signals forming video/audio programs on special library channels adapted to be processed for reception on the subscriber receivers 22 when tuned to such library channels. The recorded signal outputs of the library 32 are transmitted to modulators 36 associated with the library channels for broadcast by transmitter 16 through the cable 14. The broadcast transmission is however scrambled by encoders 34 having different codes for each program. In accordance with the present invention, the code pattern is selected by the computer to cause synchronizers 38 to apply code information from encoders to the audio broadcast signals. Such code information, in the form of inaudible synchronizing tones, is transmitted with the program signals to be broadcast by the transmitter 16. In this manner, the audio/video broadcast signals received at the subscriber stations are descrambled under control of code synchronizing information originating at the library station.

Referring now to FIG. 2, the code synchronizing information transmitted by cable 14 is applied to a detector 40 in the unauthorized use preventing system 26 at each subscriber station. Detector 40 is interfaced with the memory in command unit 24 through a decoder 42 in the command unit. A memory erase control 46 is activated for security purposes through gate logic which includes by way of example, three AND gates 48, 50 and 52. The AND gates have first inputs respectively connected to sensors 54, 56 and 58 which monitor the physical continuity of connections 60, 62 and 64. The connection 60 supplies operating energy from source 66 to the unit 24, while connections 62 and 64 respectively couple the telephone lines of system 12 and the cable 14 to unit 24. The second input of each AND gate is interconnected with the first input of another AND gate so that at least one memory erasing output will be produced from the gate logic in response to the sensing of a discontinunity in at least two of the connections 60, 62 and 64. Any deliberate attempt to uncouple a command unit 24 from its subscriber installation will therefore erase its memory to prevent unauthorized use. Memory erase with respect to instruction data received from the library station is also effected in response to reception of the broadcast signal transmission.

The command unit 24 may have a front control panel as shown by way of example in FIG. 3 with conventional types of couplings establishing the connections 60, 62 and 64 aforementioned. A multiple pushbutton type of key pad code selector 68 is mounted on the unit panel as well as a 6 digit LED type display 70. In addition to various expanded data handling functions, the code selector 68 enables the subscriber to input a digital code representing the selection of a program from the library. The desired available playing time segment is selected through a key pad type of time selector 72, having 12 hour pushbuttons, for example. AM and PM pushbuttons 74 and 76 are also provided to complete a time selection entry. A command pushbutton 78 is adapted to be actuated to initiate a dialing operation after library program and time selections are entered through the code and time selectors, the entered data being verified on display 70. The library selection may be cancelled at any time before reception of the selected program by acutating a cancel pushbutton 80. A channel selection pushbutton 82 is also provided to interrupt reception of a library selected program on the library assigned channels in favor of a standard televison program channel.

FIG. 4 illustrates the internal arrangement of the command unit 24 through which the television receiver 22 is coupled to the television cable connection 64 by a down converter and descrambler component 84 of a commercially available type which performs the channel control functions as herinbefore described to prevent unauthorized use. The component 84 is switched from one channel to another for signals transmission between cable input line 86 and output line 88 to the receiver 22 under control of an output in line 90 from multiplexer 92. The multiplexer receives signal inputs from a latch 94 and decoder 96 to which data inputs and address inputs are respectively applied from a microprocessor 98. Program and time selection data is entered into the microprocessor through the key pad formed by the selector 68, 72, 74 and 76 aforementioned in connection with FIG. 3. Some of the address and data outputs and a control output of the microprocessor are applied to an automatic dialer 100 in order to dial the modem terminals 30 at the library station for program selection purposes. Such dialing is effected by output pulses of the dialer being applied through resistor 102 to the base of a switching transistor 104 having an output collector connected to line pulsing relay 106. The relay switch 108 is connected between the telephone lines and the output of a telephone modem 110 interfacing the telephone lines with the microprocessor 98 in accordance with telephone industry standards. Thus, upon establishment of an interrogating telephone link with a modem terminal 30 at the library after completion of the dialing process, memory data between the microprocessor 98 in the subscriber command unit 24 and the computer 28 at the library station may be transmitted. Power for operating the automatic dialer and dialing relay 106 is derived from the external power source 66 through a power supply 112. Power for receiver 22 is turned on in response to a switch on signal from the automatic dialer 100 applied through resistor 114 to the base of transistor 116. The transistor 116 then conducts to energize relay 118 closing its normally open power switch 120.

Figure 5:
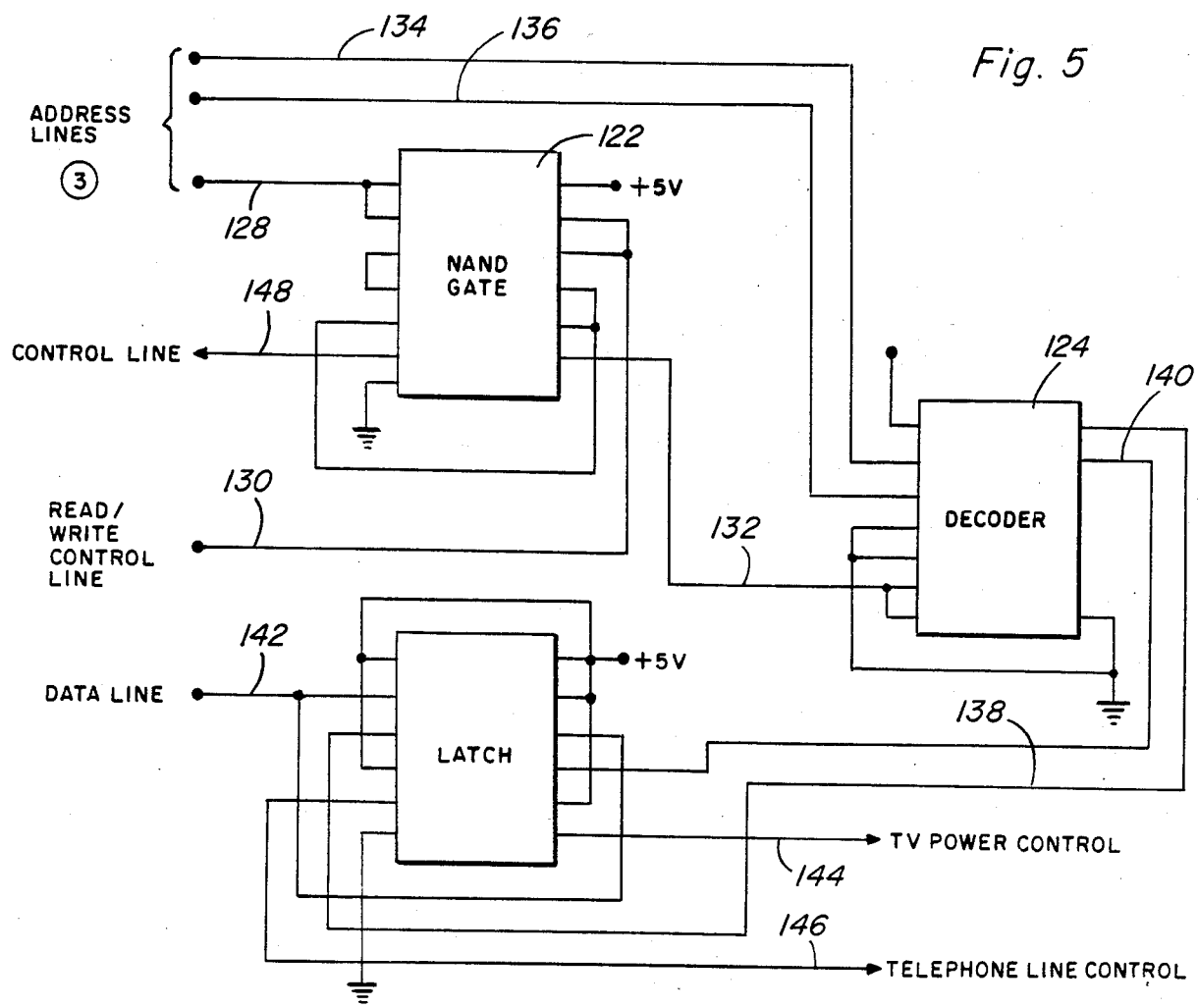
FIGS. 5 and 6 are circuit diagrams illustrating portions of the command terminal in greater detail.

FIG. 5 illustrates the make-up of the automatic dialer component 100 in accordance with one embodiment, involving the use of three data processing chips 122, 124, and 128 to which operating voltage is supplied from the power supply 112. Chip 122 functions as a NAND gate connected to input lines 128 and 130 respectively receiving address and read/write control inputs from the microprocessor 98. An output of the NAND gate 122 is connected by line 132 to one input of chip 124 functioning as a decoder to which two other input lines 134 and 136 are connected receiving address inputs from the microprocessor 98. The decoder chip outputs signals in lines 138 and 140 to the chip 126 acting as a latch to which an input line 142 is connected receiving a data input from the microprocessor 98. The latch controls the transmission of the receiver switch-on signal through line 144 and the dialing pulses through line 146. Operation of the NAND gate 122 is related through control line 148 to decoder 96 aforementioned in connection with the processing of address information outputted from the microprocessor 98 as shown in FIG. 4.

Figure 6:
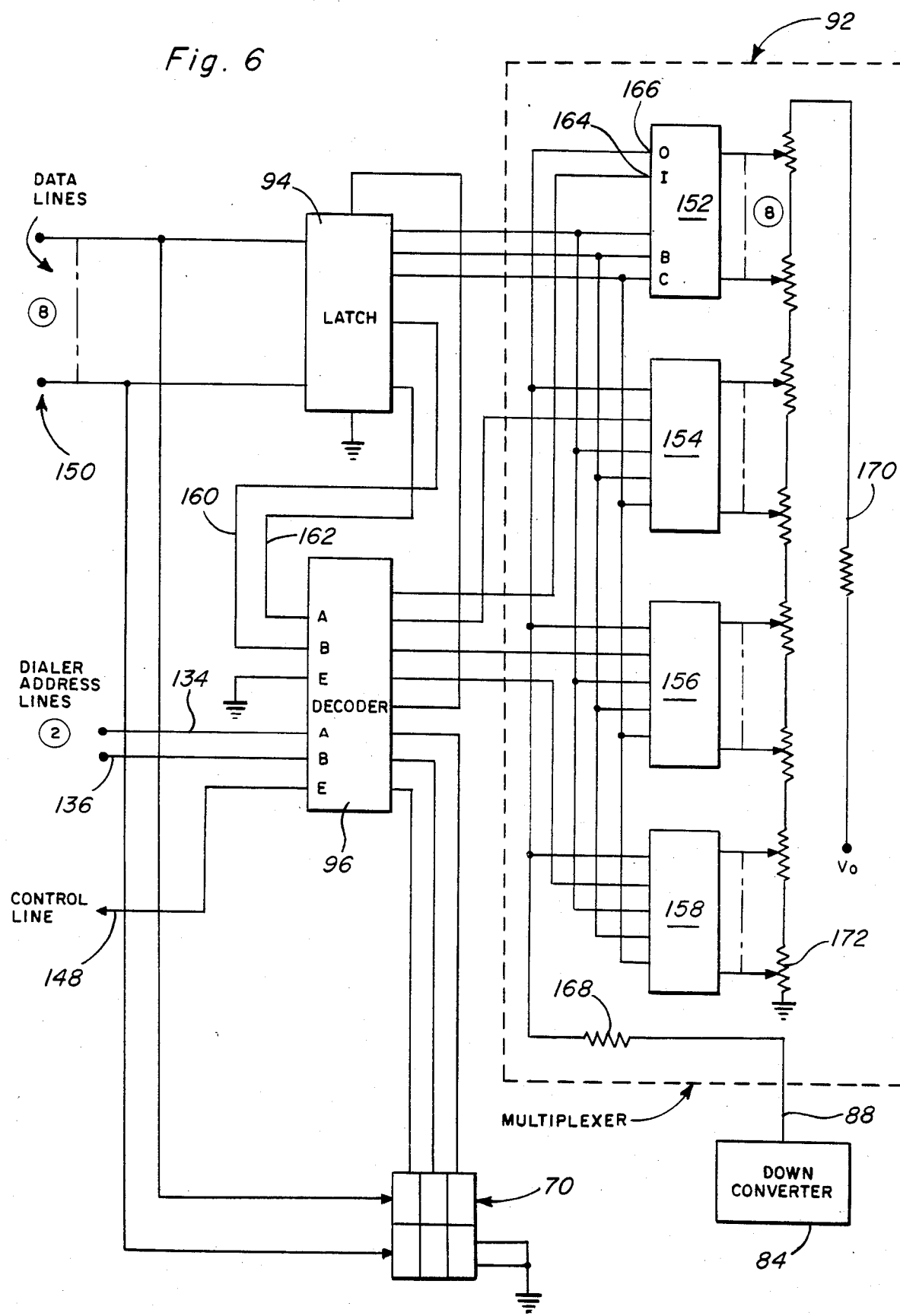

The data processing arrangement involving decoder 96, latch 94 and multiplexer 92 as depicted in FIG. 4, is shown in greater detail in FIG. 6. Output data from the microprocessor 98 is applied through eight data lines 150 in parallel to input pins of the chip acting as latch 94 and to the display 70. Two of the dialer address lines 134 and 136 aforementioned are connected to the chip acting as decoder 96 to which control line 148 is also connected from the NAND gate 122, aforementioned in connection with FIG. 5. Three data outputs from the latch 94 are applied in parallel to three input pins 151 of four chips 152, 154, 156 and 158 which form the multiplexer 92. The decoder 96 interconnected with latch 94 through lines 160 and 162, has four outputs respectively connected to input pins 164 of the four multiplexer chips. The output pins 166 of the four multiplexer chips are interconnected in parallel to the signal output line 88 through a resistor 168. Inputs are applied to the multiplexer chips from a voltage divider network which includes another voltage dividing resistor 170 and thirty-two series connected adjustable resistors 172. The resistors 172 have intermediate taps respectively connected to the input pins of the multiplexer chips 152, 154, 156 and 158.

Figure 8:
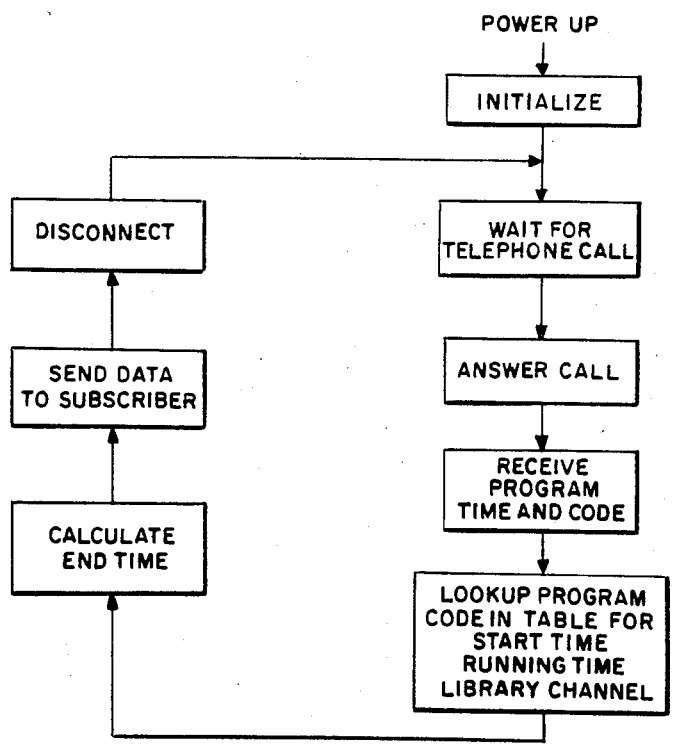
FIGS. 7 and 8 are data flow charts respectively depicting computer programming at the subscriber and library stations.
Figure 7:
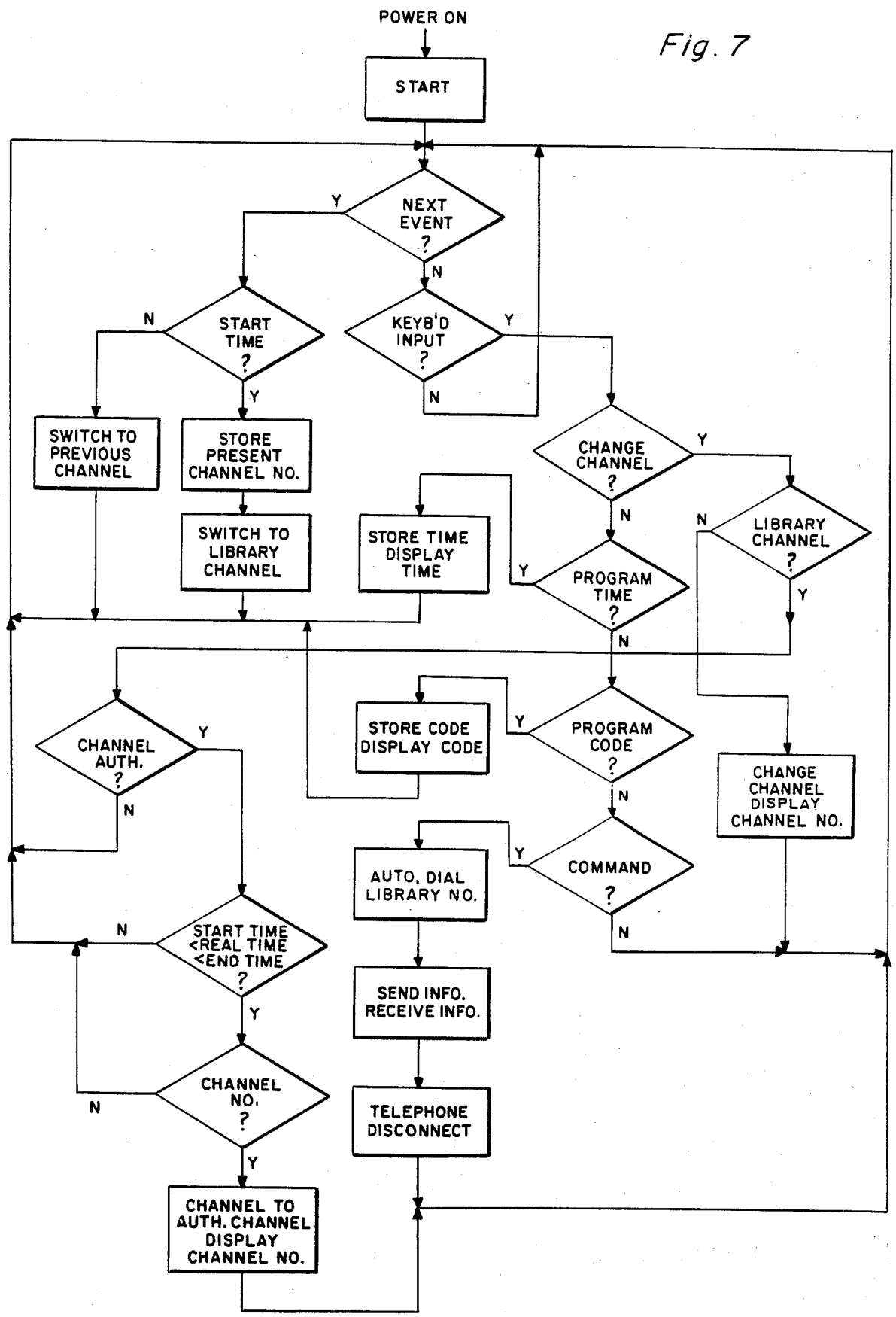

The microprocessor 98 may be a special purpose computer or a commercially available home computer having a 19-pin key pad connection and a 24-pin connection to the telephone interface modem 110 as depicted in FIG. 4. Through its data, address and control pin connections to the display 70, latch 94, decoder 96 and dialer 100 as hereinbefore described, the microprocessor performs its functions in accordance with a software program as depicted in the flow chart of FIG. 7 to interact with the programming of the library computer 28 as depicted by the program flow chart of FIG. 8. The interaction between computers 98 and 28 is made possible by the establishment and reestablishment of interrogating and response telephone links during each operational sequence initiated after entry of program selection data to the command unit 24.

The subscriber is responsible for entering selection data obtained from a printed program guide or schedule which identifies each listed library program with a selection code such as a two digit program number. The program number is entered by depressing correspondingly numbered pushbuttons of the code selector 68 as shown in FIG. 3. Based on the same program guide, the subscriber selects one of the available time segments for the selected program and enters the starting time by depressing one of the pushbuttons of time selector 72 and either pushbutton 74 or 76. The program code and program time when entered in sequence are temporarily stored in a memory of the microprocessor 98 interfaced with latch 94 and decoder 96 for visual display of the program code and program time through display 70 connected to the data output lines 150 and to three of the output lines of decoder 96. The subscriber may then depress the command pushbutton 82 after visually verifying the correctness of the data entry, to produce a control signal output in line 130 initiating an automatic dialing operation wherein the program code is converted into a telephone number to which one of the modems 30 responds at the program library. The establishing of a telephone link with the library computer 28 places a carrier signal on the line which is recognized in the microprocessor 98 to transmit a command signal through the telephone lines causing the library computer to perform a programmed search through its memory file to match the program code and programm time data transmitted thereto from microprocessor 98. When such match occurs, the library computer transmits through the telephone link established, computer generated instruction data including the program start time, end time and program transmission channel sequence. This computer generated instruction data is stored in a random access memory of the microprocessor 98 and hang-up occurs to terminate the telephone link.

According to one modification of the foregoing interrogation and response sequence, the initial telephone link transmits an identification code stored in the microprocessor 98 to the library computer 28 with the readout of the entered program code and time data. Hangup then occurs. If the identification code is verified in the library computer by match with the subscriber station code the telephone link is reestablished by the library computer to transmit the instruction data for storage in the memory of the microprocessor 98. This instruction data is erased if any attempt is made to disconnect the command unit as aforementioned.

Under control of a programmed clock in the microprocessor 98 and the program time instruction data is stored in its memory, commands are timely issued through the latch 94 and decoder 96 to multiplexer 92 for switching the receiver on, changing the standard channel setting to the library program channels and then restoring the receiver channel to the original standard channel setting at the end of the program. The foregoing receiver control functions are exercised through the down converter 84. A synchronizing signal component in the broadcast signal transmitted to descrambler 84 controls the reading from the memory in processsor 98 of the channel switching sequence loaded in advance of program reception so that the converter may perform the descrambling function as hereinbefore described.

Commercially available data processing chips and components have been utilized in the arrangement hereinbefore described, including a 16K computer, VIC-20 for the microprocessor 98 having a 24-hour clock with time logic control in accordance with the software program hereinbefore described. The modem 110 is a VICMODEM model 1600 while the converter 84 is a thirty-five channel R-F converter made by Hamlin. The channel modulators 36 are Model 6350 made by Scientific Atlanta. Standard NAND gate, decoder, latch and multiplexer chips are also utilized. It will, of course, be appreciated that other equivalent components may be utilized to perform the same individual functions necessary to meet the requirements of the described systems.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a communication system including a program library having a broadcast transmitter, a plurality of modulators connected to the transmitter, program record player means connected to said modulators for transmission of a plurality of discrete recordings of broadcast signals during periodically repeated time segments and computer means for generating information relating to identification of said discrete recordings and the time segments associated therewith; telephone means linked to the computer means of the program library through a plurality of terminals, a plurality of subscriber command units connected to the telephone means at associated subscriber stations, and standard broadcast signal receivers at said subscriber stations connected to the command units, each of said command units having selection data entry means for dialing from said terminals through the telephone means to initially establish a telephone link with the computer means through which the computer generated information is transmitted and memory means for storing the computer generated information transmitted through the telephone link established by the dialing means, broadcast means connected to the transmitter of the program library for transmission of the broadcast signals and converter means in each of the command units at the subscriber stations for coupling the broadcast means to the standard receiver under control of the computer generated information stored in the memory means.

2. In a communication system including a program library having a broadcast transmitter, a plurality of modulators connected to the transmitter, program record player means connected to said modulators for transmission of a plurality of discrete recordings of broadcast signals during periodically repeated time segments and computer means for generating information relating to identification of said discrete recordings and the time segments associated therewith; telephone means linked to the computer means of the program library through a plurality of terminals, a plurality of subscriber command units connected to the telephone means at associated subscriber stations, and standard broadcast signal receivers at said subscriber stations connected to the command units, each of said command units having means for dialing said terminals through the telephone means to establish a telephone link with the computer means through which the computer generated information is transmitted and memory means for storing the computer generated information transmitted through the telephone link established by the dialing means, broadcast means connected to the transmitter of the program library for transmission of the broadcast signals and converter means in each of the command units at the subscriber stations for coupling the broadcast means to the standard receiver under control of the computer generated information stored in the memory means, an independent source of energy at each of the subscriber stations for powering operation of the command units, sensing means for detecting disconnection of each of the energy sources, the telephone means and the broadcast means and logic means connected to the sensing means for erasing the memory means in response to disconnection of any two of the energy source, the telephone means and the broadcast means at each of the command units.

3. The combination of claim 2 including means for storing a subsciber identification code transmmitted from the command unit to the computer means through the established telephone link, means connected to the telephone means for reestablishing the telephone link from the program library to the subscriber station associated with the subscriber identification code, and means responsive to said reestablishment of the telephone link with the command unit at the associated subscriber station for controlling the converter means.

4. The combination of claim 1 including means for storing a subscriber identification code transmitted from the command unit to the computer means through the established telephone link, means connected to the telephone means for reestablishing the telephone link from the program library to the subscriber station associated with the subscriber identification code, and means responsive to said reestablishment of the telephone link with the command unit at the associated subscriber station for controlling the converter means.

5. In combination with a library computer, a broadcast transmitter from which program signals are transmitted by cable to standard signal receivers at a plurality of subscriber stations, and an authorizing telephone system through which dialed telephone links are established between each of said subscriber stations and said library computer, the improvement comprising means connecting the telephone system to the library computer for providing a plurality of separate communication paths through which said telephone links are established, selector means at each of the subscriber stations for selectively establishing said telephone links, and timing control means connected to each of the selector means for reception of the program signals by the signal receivers after elapse of a selected period of time following the establishment of the telephone links.

6. The improvement as defined in claim 5 including memory means connected to the timing means for storing information transmitted thereto through telephone links from the library computer and means for erasing the stored information from the memory means in response to said reception by the signal receivers.

7. In combination with a one-way signal broadcasting system having a broadcast transmitter and a receiver respectively located at remote stations and a telephone system through which two-way communication between said stations is established, said telephone system having a plurality of terminals at the transmitter station through which said two-way communication is established with a single terminal at the receiver station and a command unit connected to the single terminal at the receiver station, said command unit including data entry means for entering program selection data transmitted by said two-way communication, means responsive to initiation of said two-way communication from the receiver station for transferring instruction data from the transmitter station to the receiver station, memory means for storing the transferred instruction data at the receiver station, and programmed means connected to the memory means for controlling operation of the receiver in accordance with the stored instruction data.

8. In combination with a library computer, a broadcast transmitter from which program signals are transmitted to standard signal receivers at a plurality of subscriber stations, and a separate authorizing telephone system through which dialed telephone links are established with said subscriber stations, the improvement comprising means connecting the telephone system to the library computer for providing a plurality of communication paths thereto from the subscriber stations through said telephone links, selector means at each of the subscriber stations for selectively transmitting program selection data through said telephone links to the library computer, and timing control means connected to each of the selector means for reception of the program signals by the signal receiver after elapse of selected periods of time following said transmission of the program selection data through the established telephone links to the library computer.

9. The improvement as defined in claim 8 wherein the timing control means includes memory means for storing timing information transmitted thereto through the telephone links from the library computer.

10. The improvement as defined in claim 9 including means for erasing the timing information stored in the memory means in response to said reception of the program signals by the signal receivers.

* * * * *